July 16, 1929.  T. O. MEADORS  1,721,185
BOTTLE CAP AND TICKET HOLDER
Filed Jan. 10, 1928

Inventor
Thomas O. Meadors
By Herbert E. Smith
Attorney

Patented July 16, 1929.

1,721,185

UNITED STATES PATENT OFFICE.

THOMAS O. MEADORS, OF SPOKANE, WASHINGTON, ASSIGNOR OF ONE-HALF TO LEON F. POWERS, OF SPOKANE, WASHINGTON.

BOTTLE CAP AND TICKET HOLDER.

Application filed January 10, 1928. Serial No. 245,698.

My present invention relates to an improved bottle cap and ticket holder which while adapted for use with various types of bottles and jars and for many different purposes, is especially designed for use with the standard milk bottles. The primary object of the invention is the provision of a cap of this character that may readily be attached to or detached from the milk bottle and which is provided with means for receiving a ticket or other identifying or advertising missive. Thus the cap is designed to fit over the top of an empty milk bottle and a price ticket may be attached to the cap for the milk-man. When delivering milk the milk-man removes the cap from the empty bottle and the price ticket from the cap and then places the cap over the head of the full bottle of milk which he substitutes for the empty bottle. The cap thus protects the bottle of milk against intrusion by cats, dogs, or other animals and the bottle, of course, is kept in a sanitary condition.

The bottle cap preferably is fashioned of metal such as aluminum and is provided with resilient means whereby it may be snapped into position over the head of the milk bottle, and with equal facility may be detached therefrom.

The invention consists in certain novel combinations and arrangements of parts as will hereinafter be more fully described and claimed.

In the accompaying drawings I have illustrated one complete example of the physical embodiment of my invention wherein the parts are combined and arranged according to the best mode I have so far devised for the practical application of the principles of my invention.

In order that the general arrangement and relation of parts may readily be understood I have shown a portion of a milk bottle as B having the usual bead end around its neck and the annular seat S for the usual pasteboard disk, not shown, that is provided for milk bottles.

Figure 2:
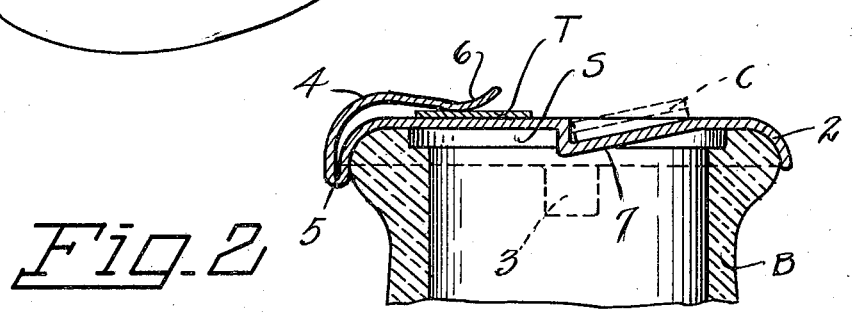
Fig. 2 is a sectional detail view as at line 2—2 of Figure 1.
Figure 3:
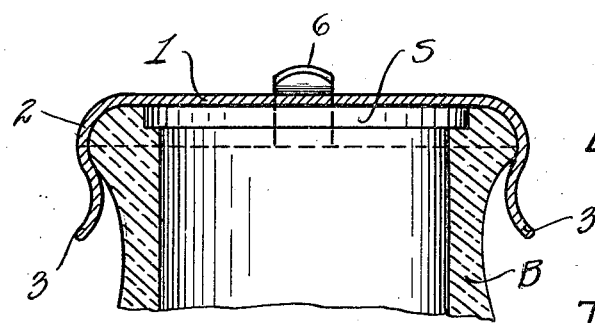
Fig. 3 is a sectional detail view as at line 3—3 of Figure 1.

The cap 1 is of circular shape and fashioned of metal such as aluminum, that will not rust, and which may readily be cleansed, and the cap is provided with an annular flange 2 which conforms to the contour of the bead end of the bottle, and thus snugly over said bead as indicated in Fig. 2. The cap is fashioned at diametrically opposite points with snap springs 3, 3 which are fashioned in the form of integral flanges and adapted to snap over the edge of the bead end of the bottle. The cap is shown in the drawings in place on the bead to cover the bottle and the spring plates or snap springs 3, 3 are shown as snapped over the edge of the bead end. To remove the cap it is only necessary to slip the finger or thumb under one of the snap springs 3 and pull the cap from the bottle.

Figure 1:
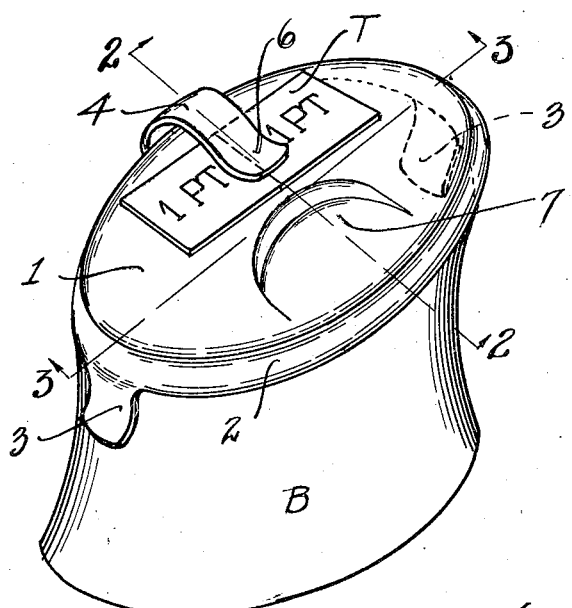
Figure 1 is a perspective view showing a portion of the top of a milk bottle with the bottle cap of my invention attached thereto and a price ticket retained on the cap.

A price ticket T is shown in the drawing and this is retained on the top of the cap as shown in Fig. 1. A retaining clip is fashioned integrally with the cap for holding the price ticket and this clip 4 is formed by bending the metal at 5 at the lower edge of the flange 2, and the free end of the clip is bent or provided with a reverse curve 6. Thus the clip turns up and over a portion of the cap and the curved free end 6 is held by the resiliency of the metal against the top face of the cap 1. Thus when the ticket T, indicating that one pint of milk is desired, is to be put in position it is slipped between the curved free end of the retaining clip and the upper face of the cap and they are retained by friction.

In some instances the milk may be paid for with a coin C and for this purpose I provide a depression 7 in the metal cap 1 to receive the coin and prevents its displacement. The coin when placed in the depression or pocket 7 will indicate to the milkman the quantity of milk desired or the coins may be used to purchase tickets from the milk-man.

Having thus fully described my invention what I claim as new and desired to secure by Letters Patent is:

1. The combination with a cap including a circular metal disk having an annular flange adapted to fit over the bead of a bottle, of integral spring plates on said flange adapted to snap under said bead, and a spring clip fashioned integral with said flange and comprising an arm bent over the bead of the bottle and provided with an upwardly curved free end.

2. A bottle cap comprising a circular metal disk having a coin-receiving depression in its upper face, an annular flange on said disk adapted to fit over the neck-bead of a bottle, resilient plates projecting below the flange for attachment to the bottle, and a resilient retaining clip on the flange projecting over the cap for coaction with the upper face of the disk to receive and retain a ticket.

In testimony whereof I affix my signature.

THOMAS O. MEADORS.